United States Patent Office 2,879,274
Patented Mar. 24, 1959

2,879,274

NITRO- AND AMINO-NAPHTHOTRIAZOLE QUINONES

Mario Scalera, Somerville, and Andrew Stephen Tomcufcik and William Baptist Hardy, Bound Brook, N.J., assignors to American Cyanamid Company, New York, N.Y., a corporation of Maine No Drawing. Application January 21, 1954
Serial No. 405,493

14 Claims. (Cl. 260—308)

This invention relates to new intermediates for vat dyes namely 1(N)-lower alkyl naphthotriazole-4,9-quinones and vat dyestuffs prepared therefrom.

It has been proposed in the past to prepare vat dyestuffs using an analogue of anthraquinone as one or more of the substituents in the molecule, the analogue being one in which one of the two benzene rings of anthraquinone is replaced by a heterocyclic ring. In general these dyestuffs have not enjoyed as great commercial success as the anthraquinone derivatives because they lack the enormous stability of the anthraquinone nucleus which contributes so much to the fastness properties of anthraquinone dyestuffs.

Among the heterocyclic anthraquinone analogues is naphthotriazole-4,9-quinone which has the following formula

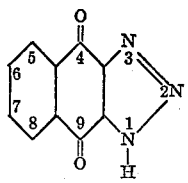

This compound is no more stable than other heterocyclic analogues of anthraquinone but we have found that when the imino hydrogen of the triazole ring is replaced by a lower alkyl group, that is to say one having six or less carbon atoms and the benzenoid ring is substituted in one or more of its alpha positions 5 and 8 by an amino group, dyestuffs can be prepared which show extraordinary fastness. Apparently, the lower alkyl group destroys the reactivity of the triazole ring and thus achieves a high degree of stability which permits production of vat dyestuffs of excellent fastness. The alpha-amino-naphtho-1(N)-alkyl triazole-4,9-quinones may be prepared by processes which are analogous to those used in introducing amino groups into anthraquinone compounds, for example, the alpha position may be nitrated and reduced. The nitro compounds are in themselves new compounds and are included in the scope of the present invention.

The triazole ring itself is symmetrical in the sense that it probably exists in tautomeric forms with the hydrogen shifting from N1 to N3 with a corresponding shift of the double bond. Once, however, the hydrogen has been replaced by lower alkyl, the two alpha positions the 5 and 8 on the benzenoid ring become non-equivalent as is shown by the following formulae

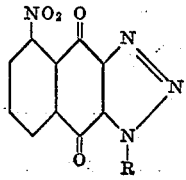 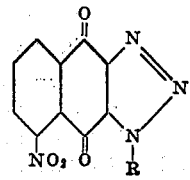

in which R is lower alkyl. These formula represent the first step in the production of amino compounds by the nitration and reduction method. It has not been determined which isomer is preferentially formed and it is probable that a mixture is produced. This is, however, of no importance as the dyestuffs prepared from the intermediates always have the same properties. As the different isomers may be thought of as occurring with the lower alkyl group connected with one or other of the odd numbered nitrogen atoms of the triazole ring, the simplest way to represent the products is to show the lower alkyl group entering into the triazole ring without specifying its position. This is done throughout this specification by using the following type of formulae:

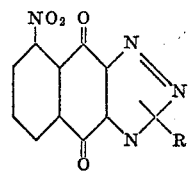

to represent isomers A and B:

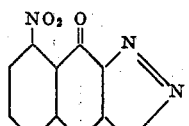

A                B

R representing lower alkyl as above. The mononitro compound is used only for purpose of illustration and the same principle applies to all other compounds used herein. In any event the generic formula represents the situation where the compound is either a 5 or 8 nitro derivative.

Typical dyestuffs which can be prepared from monoamino compounds of the present invention include the naphthotriazole analogue of indanthrone. This is prepared by introducing a bromo group ortho to the NH₂ group and condensing to form the dihydroazine. The dyestuff has a much greener shade than the corresponding homocyclic product. The equation is as follows:

Another type of dyestuff involves condensation with a halogenated benzanthrone producing first the corresponding imine and finally the analogue to benzanthrone acridine. The production, which is effected by the usual process of alcoholic potassium hydroxide fusion to effect the ring closure, is shown by the following equation:

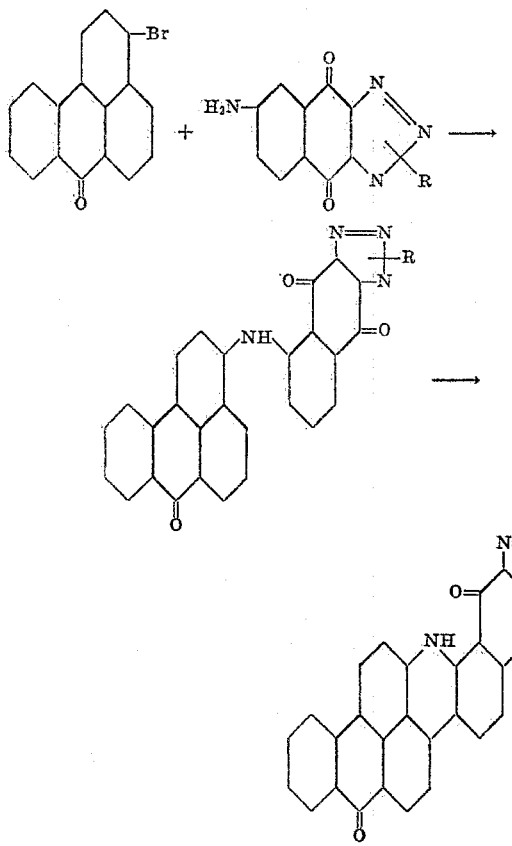

It is also possible to prepare diamino compounds in which both the 5 and 8 positions are substituted by amino groups. This is effected by first producing a monoamino compound, converting it to its oxamidic acid derivative, which can then be subjected to further nitration of the other alpha position in the benzenoid ring. On reduction and hydrolysis this produces a compound having the following formula:

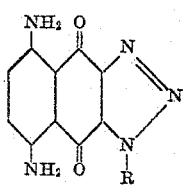

This product can be easily isolated in its stable leuco form.

Another procedure for introducing amino groups may also be employed which is analogous to that in the anthraquinone series. This process involves preparing a leuco form of a 5,8 diamino naphthotriazole by further nitration of a monoamino naphthotriazole and reduction of the resultant nitroamino compound and then reacting with suitable amine, for example, aliphatic amines, hydroxy-aliphatic amines and the like. A typical compound is the following shown in its oxidized form:

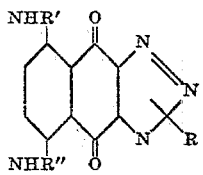

in which R and R' are lower alkyl groups and R" is a hydroxyalkyl group. These dyestuffs show an especially good resistance to gas fading. It is not known why the superior resistance to gas fading is obtained when one of the benzenoid rings of the anthraquinone is changed to the alkyl triazole ring and it is not intended to advance any explanation of why this increased stability results.

The alkylation of the triazole is carried out in the normal manner and any of the ordinary lower alkyl groups can be introduced, for example, methyl, ethyl, propyl, isopropyl, butyl, isobutyl, amyl, isoamyl, and the like. As methyl is the easiest alkyl group to be introduced and the stability is obtained regardless of which lower alkyl group is attached to the triazole ring, the methylated derivatives are preferred.

The position on the benzenoid ring not occupied by the amino group may be otherwise substituted by other groups such as alkyl, for example, methyl, ethyl, propyl, halogens such as chlorine and bromine and the like. When the substituent is on the beta-position, it is theoretically possible to produce isomeric mixtures but the more probable event is that the substituent will induce nitration in the alpha position nearest it.

Our invention can be illustrated by the following examples in which parts are by weight unless otherwise indicated.

*Example 1*

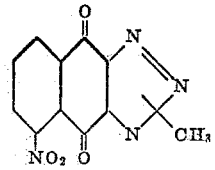

A solution of 31.1 parts of 1(N)-methylnaphthotriazole-4,9-quinone in 270 parts of sulfuric acid is stirred. 16.75 parts of 70% nitric acid is added gradually. The exotherm of the reaction causes the temperature to rise and after the addition is complete the mixture is stirred at 100–105° C. until nitration is substantially complete. The reaction mixture is then cooled and drowned in 1500 parts of ice water. The bright yellow product is isolated by filtration, washing, and drying. A good yield of a mixture of mononitro-1(N)-methylnaphthotriazole-4,9-quinones is obtained.

*Example 2*

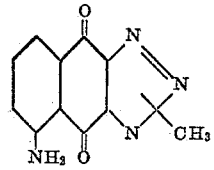

Twenty-five parts of product of Example 1 is slurried with 200 parts of ethanol and 1 part of a 10% mixture of palladium on charcoal is added. The mixture is then placed under mild pressure in an atmosphere of hydrogen until reduction is substantially complete. The ethanol suspension is then drowned in 1000 parts of 2% sodium hydroxide solution containing 15 parts of sodium hydrosulfite. The deep red solution is clarified by filtration to remove the catalyst and the filtrate on aeration precipitates a good yield of a red precipitate of a mixture of amino - 1(N)-methyl-naphthotriazole - 4,9 - quinones. This mixture may be isolated by filtration, washing, and drying.

*Example 3*

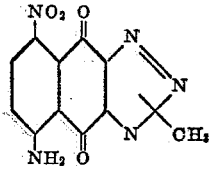

12.3 parts of the product of Example 2 is pulverized and mixed with 85 parts of oxalic acid. The mixture is heated at 120° C. until conversion to the oxamino compond is substantially complete. The deep brown fluid mixture is then cooled and leached with 300 parts of warm water. The insoluble residue is filtered and dried.

The crude derivative of oxamidic acid thus prepared is dissolved in 110 parts of sulfuric acid and stirred at 0°–5° C., during a gradual addition of 5.6 parts of 70% nitric acid. The mixture is then held a short time at 0°–5° C. after which it is stirred and allowed to warm to room temperature. It is then stirred at room temperature until nitration is substantially complete. The mixture is drowned in water to produce a dull yellow precipitate, which on isolation by filtration, washing, and drying, is found to be a good yield of nitro-oxamino-1(N)-methylnaphthotriazole-4,9-quinone.

The crude product so isolated is dissolved in 1000 parts of 5% potassium carbonate solution. This solution is then heated to 90–95° C. until precipitation of the mixture of nitroamino compound is complete. The latter is then isolated by filtration, washing, drying, and is obtained in good yield. It may be recrystallized from high boiling solvents.

*Example 4*

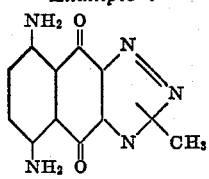

The nitro-amino compound produced in Example 3 is reduced catalytically in the same manner as described in Example 2. A good yield of 1(N)-methyl-5,8-diamino naphthotriazole-4,9-quinone in the form of its stable leuco is obtained.

*Example 5*

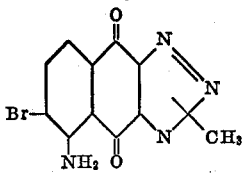

Five parts of the product of Example 2 is suspended in 130 parts of glacial acetic acid and 3.5 parts of bromine is added. The reaction mixture is stirred at the boil for several hours and then is allowed to cool to room temperature slowly. The precipitated product is isolated by filtration and washing. It apparently consists of a mixture of the 5-amino-6-bromo and 8-amino-7-bromo derivatives of 1(N)-methylnaphthotriazole-4,9-quinone.

By reaction with cuprous chloride in alpha picoline solution, by the method described by Hardy and Fortenbaugh in their copending application, Serial No. 289,205, filed May 21, 1952, this bromo compound can be converted to the corresponding chloro compound.

*Example 6*

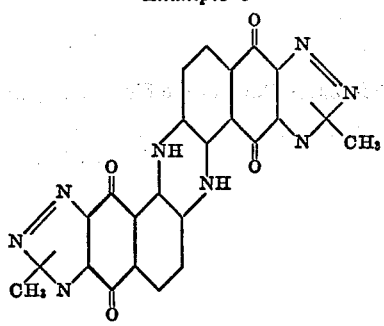

2.35 parts of the product of Example 5, 4 parts of anhydrous potassium carbonate, 0.5 part of cuprous chloride, and 90 parts of nitrobenzene are stirred at the boil until the condensation is substantially complete. The nitrobenzene is removed by steam distillation. The insoluble residue is purified by boiling with 10% hydrochloric acid followed by extraction with hot dichlorobenzene. The residual product is a dull greenish-gray solid which dyes cotton a green-gray shade.

*Example 7*

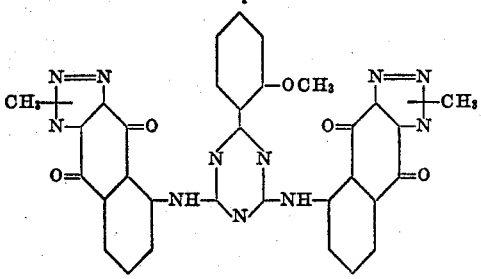

Three parts of the product of Example 2 and 1.67 parts of ortho-methoxyphenyl dichlortriazine are dissolved in 36 parts of nitrobenzene. The solution is stirred at 130–140° C. until the reaction is substantially complete. During the reaction hydrogen chloride is slowly evolved and the reaction mixture slowly turns a deep brown in color. The mixture is cooled to room temperature and the precipitated product is filtered off. A further yield of product can be obtained by diluting the filtrate with ethanol. The combined products are washed with ethanol and dried. The yellow dyestuff dyes cotton a reddish-yellow shade.

*Example 8*

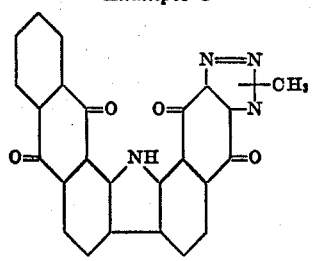

A mixture of 4.56 parts of the product of Example 2, 4.85 parts of 1-chloranthraquinone, 3.0 parts of potassium carbonate, 0.5 part of copper powder, 0.5 part of iodine, and 120 parts of nitrobenzene is stirred at the boil until the condensation is substantially complete. The nitrobenzene is then removed by steam distillation and the crude anthramide is isolated by filtering, washing, and drying. It is then slurried in 100 parts of dry pyridine and 12 parts of aluminum chloride is added gradually while keeping the temperature of the mixture below 60° C. The mixture is then heated to reflux and held there until the cyclization is substantially complete. It is then drowned in 500 parts of 10% sodium hydroxide solution. The pyridine is removed by steam distillation and the insoluble precipitated dyestuff is isolated by filtration, washing, and drying. The crude dyestuff is suspended in 20% sulfuric acid solution and heated to 90–98° C. while 1 part of sodium dichromate is added. The purified dyestuff is then isolated by filtration, washing and drying. It dyed cotton yellow-brown shades of good color value.

*Example 9*

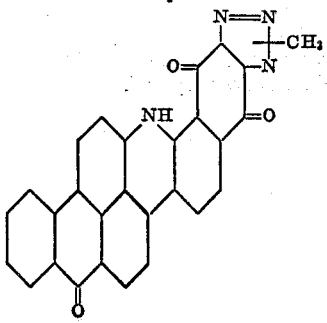

A mixture of 4.56 parts of the product of Example 2, 6.18 parts of benz-1-bromobenzanthrone, 3.0 parts of anhydrous potassium acetate, 0.5 part of copper powder, 0.5 part of iodine, and 120 parts of nitrobenzene is stirred at reflux until condensation is substantially complete. The nitrobenzene is removed by steam distillation and the dark residual product is isolated by filtration, washing, and drying. This crude product is purified by boiling with 10% hydrochloric acid for several hours and after filtering, washing, and drying, by further extraction with boiling chlorobenzene. 1.4 parts of this purified product is fused with a mixture of methanol and 50 parts of potassium hydroxide at 90–95° C. until the ring closure is substantially complete. The reaction melt is drowned in water and aerated until the precipitation of the dyestuff is complete. The precipitated dye is isolated by filtration, washing, and drying. This product dyes cotton a grayish-green shade of good color value.

*Example 10*

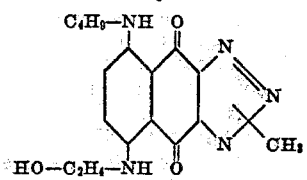

5.6 parts of the product of Example 4 in the form of the crude ethanol suspension as produced in Example 4 is treated with 1.45 parts of monoethanolamine and 1.85 parts of normal butylamine. The mixture is then refluxed until the reaction is substantially complete. 0.3 part of copper acetate and 0.8 part of piperidine is then added and the mixture is aerated for several hours. The mixture is then evaporated to dryness and the blue solid residue is extracted with acetone. By diluting the acetone with water, a blue precipitate is obtained which can be isolated by filtration, washing, and drying. It dyes celanese a violet-blue which possesses markedly superior resistance to gas fading.

*Example 11*

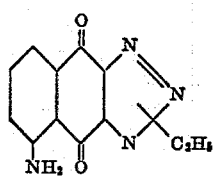

The procedure of Example 1 is followed, substituting 33.1 parts of 1(N) ethyl naphthotriazole-4,9-quinone (prepared by the action of diethyl-sulfate on naphthotriazole-4,9-quinone) for the corresponding methyl compound. The resultant mononitro compound is then reduced by the procedure of Example 2 to give a mixture of monoamino-1(N)-ethylnaphthotriazole-4,9-quinones.

This mixture can be further nitrated by the procedure of Example 3 to give a mixture of α-nitro-α'-amino-1(N)-ethylnaphthotriazole-4,9-quinones which by reduction using the procedure of Example 4 gives 5,8-diamino-1(N)-ethylnaphthotriazole-4,9-quinone.

By starting with the corresponding 1(N)-butyl compound (prepared by the reaction of butyl bromide on naphthotriazole-4,9-quinone), the corresponding nitro, amino, nitro-amino, and diamino-1(N)-butyl-naphthotriazole-4,9-quinones are prepared.

*Example 12*

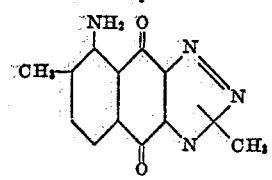

The procedure of Example 1 is followed, using 33.1 parts of the mixture of 1(N),6- and 1(N), 7-dimethylnaphthotriazole-4,9-quinones prepared by reacting 6-methylnaphthotriazole-4,9-quinone with methylsulfate. The resultant nitro compound is reduced by the procedure of Example 2 to give a mixture which is probably composed of 5-amino-1(N), 6-dimethylnaphthotriazole-4,9-quinone and 8-amino-1(N), 7-dimethylnaphthotriazole-4,9-quinone.

We claim:

1. Alpha-nitro-1(N)-lower alkyl-naphthotriazole-4,9-quinone.
2. The compound according to claim 1 in which the alkyl group is methyl.
3. Alpha-amino-1(N)-lower alkyl-naphthotriazole-4,9-quinone.
4. The compound according to claim 3 in which the alkyl is methyl.
5. The compound according to claim 3 in which the benzenoid ring contains a halogen group ortho to the amino group.
6. The compound according to claim 5 in which the alkyl group is methyl.
7. Alpha-nitro-alpha-amino-1(N)-lower alkyl-naphthotriazole-4,9-quinone.
8. The compound according to claim 7 in which the alkyl is methyl.
9. 5,8-diamino-1(N)-lower alkyl-naphthotriazole-4,9-quinone.
10. The compound according to claim 9 in which the alkyl is methyl.
11. Alpha - alkylamino - alpha - 2-hydroxyethylamino-1(N)-lower alkyl-naphthotriazole-4,9-quinone.
12. The product according to claim 11 in which the alkyl group is methyl.
13. Alpha-n-butylamino-alpha-2 - hydroxyethylamino-1(N)-lower alkyl-naphthotriazole-4,9-quinone.
14. A compound having the following formula

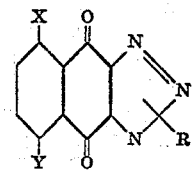

in which R represents a lower alkyl group, X represents a substituent selected from the class consisting of nitro and amino groups, and Y represents a substituent selected from the class consisting of hydrogen and nitro and amino groups.

References Cited in the file of this patent

Fries et al.: Chem. Abst., vol. 29, col. 3675 (1935).
Waldman et al.: Chem. Abst., vol. 35, col. 1791–2 (1941).